United States Patent
Allmaras et al.

(10) Patent No.: US 10,443,217 B2
(45) Date of Patent: Oct. 15, 2019

(54) METHOD FOR PRESSURE CONTROL IN A SUPPLY NETWORK, DEVICE AND SUPPLY NETWORK

(71) Applicant: SIEMENS AKTIENGESELLSCHAFT, München (DE)

(72) Inventors: Moritz Allmaras, München (DE); Jan Christoph Wehrstedt, München (DE); Utz Wever, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 136 days.

(21) Appl. No.: 15/117,317

(22) PCT Filed: Jan. 15, 2015

(86) PCT No.: PCT/EP2015/050668
§ 371 (c)(1),
(2) Date: Aug. 8, 2016

(87) PCT Pub. No.: WO2015/139853
PCT Pub. Date: Sep. 24, 2015

(65) Prior Publication Data
US 2017/0037604 A1 Feb. 9, 2017

(30) Foreign Application Priority Data
Mar. 21, 2014 (DE) .................. 10 2014 205 332

(51) Int. Cl.
*E03B 7/02* (2006.01)
*G05B 19/042* (2006.01)
(Continued)

(52) U.S. Cl.
CPC ............. *E03B 7/02* (2013.01); *G05B 17/02* (2013.01); *G05B 19/042* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 3,958,449 A | 5/1976 | Drescher | |
| 2002/0152030 A1* | 10/2002 | Schultz | ........... E21B 47/00 702/6 |

(Continued)

FOREIGN PATENT DOCUMENTS

| CN | 1509426 A | 6/2004 |
|---|---|---|
| CN | 102272456 A | 12/2011 |

(Continued)

OTHER PUBLICATIONS

International Search Report for PCT Application No. PCT/EP2015/050668, dated Mar. 24, 2015.

(Continued)

*Primary Examiner* — Tuan C Dao
(74) *Attorney, Agent, or Firm* — Schmeiser, Olsen & Watts LLP

(57) ABSTRACT

A supply network for supplying consumers with a medium is provided. Based on a reduction of data and a subsequent reconstruction of at least one pressure and/or flow value, the state at least at one further location in the supply network can be determined without having to be measured. An improved actuation of the at least one pump and/or of the at least one valve is thus possible. A device for pressure control in a supply network is also provided.

14 Claims, 4 Drawing Sheets

(51) Int. Cl.
*G05B 17/02* (2006.01)
*G06F 17/18* (2006.01)

(56) References Cited

U.S. PATENT DOCUMENTS

| | | | |
|---|---|---|---|
| 2003/0010509 A1* | 1/2003 | Hoffman | A62C 3/04 169/56 |
| 2004/0156681 A1 | 8/2004 | Weyer | |
| 2004/0163731 A1* | 8/2004 | Eichelberger | B60S 5/02 141/284 |
| 2005/0283295 A1* | 12/2005 | Normann | E02F 9/26 701/50 |
| 2006/0243331 A1* | 11/2006 | Fuller | F04B 27/1804 137/596.16 |
| 2007/0092386 A1* | 4/2007 | Reed | F04B 43/0736 417/395 |
| 2008/0295568 A1* | 12/2008 | Nanaji | B67D 7/085 73/1.34 |
| 2010/0004769 A1* | 1/2010 | Holden | G06F 17/5086 700/97 |
| 2011/0035069 A1* | 2/2011 | Ogawa | H02J 3/14 700/288 |
| 2012/0029706 A1 | 2/2012 | Wagner | |
| 2013/0085619 A1 | 4/2013 | Howard | |
| 2014/0137744 A1* | 5/2014 | Wilkinson | B01D 53/047 96/152 |
| 2015/0106068 A1* | 4/2015 | Boys | G05B 17/02 703/2 |
| 2016/0146648 A1 | 5/2016 | Patel | |

FOREIGN PATENT DOCUMENTS

| | | |
|---|---|---|
| CN | 102460104 A | 5/2012 |
| CN | 103620363 A | 3/2014 |
| DE | 2422561 A1 | 11/1975 |
| DE | 693 20 547 T2 | 3/1999 |
| DE | 10 2011 078240 A1 | 1/2013 |
| EP | 0574241 A1 | 12/1993 |

OTHER PUBLICATIONS

Thornton, J., Lambert, A.: Progress in Practical Prediction of Pressure: Leakage, Pressure:Brust Frequency and Pressure:Consumption Relationships. Proceedings of IWA Special Conferences 'Leakage 2005', Halifax, Nova Scotia, Canada, Sep. 12-14, 2005.

Ulanicki, B., Bounds, P.L.M., Rance, J.P. Reynolds, L.: Open and closed loop pressure control for leakage reduction. Urban Water 2, 2000, Elsevier.

Willcox K. et al; "Unsteady flow sensing and estimation via the gappy proper orthogonal decomposition"; Computer and Fluids, Pergamon Press, NY; vol. 35; No. 2; pp. 208-226; ISSN: 0045-7930; XP027991441; 2006.

Chinese Office Action for Chinese Application No. 201580015449.8, dated May 25, 2018.

National Search Report for German Application No. 10 2014 205 332.3, dated Aug. 22, 2016.

* cited by examiner

METHOD FOR PRESSURE CONTROL IN A SUPPLY NETWORK, DEVICE AND SUPPLY NETWORK

CROSS-REFERENCE TO RELATED APPLICATIONS

This application claims priority to PCT Application No. PCT/EP2015/050668, having a filing date of Jan. 15, 2015, based off of German application No. DE 102014205332.3 having a filing date of Mar. 21, 2014, the entire contents of which are hereby incorporated by reference.

FIELD OF TECHNOLOGY

The following relates to a method for pressure control in a supply network for supplying consumers with a medium. Furthermore, embodiments of the present invention relate to a device for pressure control in a supply network and to a supply network. Even though embodiments of the present invention are described below with reference to water supply networks, it is equally applicable to other supply networks, such as e.g. gas networks or district heating networks.

BACKGROUND

The hydraulic pressure prevalent in a water supply network is an important quality feature. A high pressure guarantees that a large amount of water can be taken from the supply network within a short period of time for industrial bulk consumers and fire hydrants. At the house connections, a sufficiently high water pressure allows whole buildings, right up to the top level, to be reliably supplied with drinking water without additional pump apparatuses.

On the other hand, excessively high pressure in the supply network leads to premature aging and failure of components, for example by pipes breaking. The leaks caused thereby lead to high repair costs, water losses and, in some cases, to further damage of surrounding structures. Moreover, excessive pressure leads to an increased water loss as a result of background leaks. Such background leaks are present in every water network to a certain extent and have as a consequence a continuous loss of drinking water. Moreover, an excessive flow pressure increases the frictional losses occurring in the case of pipe flows. In supply networks in which the pressure is built up by pumps, an increase in the provided pressure immediately leads to an increased energy requirement of the pumps.

Operators of supply networks are therefore presented with the challenge of finding a compromise between these two opposing requirements in respect of the hydraulic pressure provided in the supply network. This decision is additionally made more difficult by virtue of the pressure prevalent during operation being strongly influenced by the consumption load, which may be exposed to large variations and often cannot be reliably measured or predicted. These consumption variations and switching processes of pumps and valves can furthermore lead to transient pressure peaks in the supply network, which can have a damaging effect on network components and often constitute the cause of suddenly occurring leaks.

These days, a continuously high pressure is provided in a targeted manner in many water supply networks by way of elevated tanks or continuously operating pumps. The design of the network components is already deliberately over-scaled during planning. The excessive pressure in the supply network is reduced at the points of consumption by pressure reduction apparatuses to a measure which is expedient for the consumers. The disadvantages, listed above, as a result of the long-term operation at a high pressure are often accepted.

Approaches in respect of adapting the pressure prevalent in the water distribution network to the requirements of the consumers in a targeted manner and, as a result thereof, in respect of avoiding excessive pressures together with the disadvantages accompanying these were only developed in the relatively recent past under the byword of pressure management [TL]. The techniques developed in the process include the subdivision of the supply network into pressure management zones (PMZ), in which the pressure is reduced to a minimum at the inflows as a result of targeted control of valves or pumps. Here, knowledge about the network structure, the topographic conditions of the pressure management zone and about number and type of the connected consumers is used for designing the pressure control. In order to be able to react to the dynamic pressure variations caused by changing consumption, pressure values in the zone measured online have also been adopted in the meantime for the pressure control [UBRR].

SUMMARY

Against this backdrop, an aspect relates to providing an improved method for pressure control in a supply network. Moreover, an improved device for pressure control in a supply network and an improved supply network should be provided.

Accordingly, a method for pressure control in a supply network for supplying consumers with a medium is provided. The supply network has at least one pump for pumping the medium and/or at least one valve for controlling a medium flow. The method comprises the following steps: a) determining at least one consumption profile for a respective consumer, b) determining data describing pressure and/or flow profiles in the supply network on the basis of the consumption profiles, c) reducing the data into reduced data, d) detecting at least one first pressure and/or flow value at at least one first point in the supply network, e) reconstructing at least one second pressure and/or flow value at at least one second point in the supply network from the reduced data by means of the at least one first pressure and/or flow value, and f) actuating the at least one pump and/or the at least one valve on the basis of the at least one first pressure and/or flow value and the at least one second pressure and/or flow value.

In other words, a simulation model of the supply network is therefore created. The simulation model simulates pressure and/or flow profiles in a manner dependent on consumption profiles. The data describing the pressure and/or flow profiles are subsequently reduced. All of this can take place "offline", i.e. away from the actual operation, in particular prior to putting the supply network into operation. In an "online" part of the method, i.e. during the operation of the supply network, a first pressure and/or flow value now is measured at at least one first point in the supply network by means of at least one first sensor. However, in order now to determine a second pressure and/or flow value at at least one second point in the supply network as well, the latter is reconstructed from the reduced data and using the at least one first pressure and/or flow value. In very general terms, the reduced data contain less data and/or have a lower data complexity than the (non-reduced) data. Using the reduced data for determining the second pressure and/or flow values is advantageous in that less computational power is required and, accordingly, a quick actuation of the at least one pump or of the at least one valve is made possible, in particular in real time. "Reconstructing" should be understood to mean that the at least one second pressure and/or flow value was contained or approximately contained in the (non-reduced) data and there is a back calculation to this at least one second pressure and/or flow value on the basis of the reduced data with the aid of the at least one first pressure and/or flow value.

Accordingly, the respectively current pressure and/or flow values can be either measured directly or reconstructed at each point in the supply network and therefore they are known. Consequently, the actuation of the at least one pump and/or the at least one valve can take place with knowledge about the states in the entire supply network. Therefore, the at least one pump and/or the at least one valve can be actuated in such a way that the pressure at each point in the supply network just achieves a predetermined intended pressure (for example, a minimum pressure prescribed by law). As a result of the correspondingly low pressure in the supply network, the network components situated therein are spared. Hence, leak losses are minimized.

Preferably, d) to f) are regularly repeated during the operation of the supply network. As a result, the pressure generated by the at least one pump or the medium flow controlled by the at least one valve can be adapted to the dynamic load variations occurring during operation, and so damaging pressure peaks are avoided, which in turn is advantageous in view of the service life of the network components.

Determining the consumer profile for each one of the consumers can take place either on the basis of actually known consumption values or on the basis of a standardized consideration, optionally in conjunction with a statistical approach. The actual consumption profiles are regularly not known due to the high technical complexity of the measurement and data protection frameworks, and so the standardized consideration will often be preferable. The standardized consideration proceeds from a classification of the consumers into e.g. office building, school, accommodation or industrial operation and assigns a consumption profile to each of these.

The data describing the pressure and/or flow profiles are calculated, for example, by virtue of a simulation model of the actual supply network being formed. By way of example, pipe cross sections, an applied pressure, the determined consumption profiles, i.e. the respective consumption of the consumers, the frictional losses occurring during the pipe flow and further factors can be taken into account in the simulation model.

In the present case, a supply network should be understood to mean a network in which a medium is transported from at least one source or from at least one inflow to a plurality of consumers. Here, the medium can be a fluid, for example water or gas. Furthermore, the supply network can be only part or a zone of a larger superordinate supply network. By way of example, in the present case, a supply network can be a sub-network, a PMZ or a district metering area (DMA).

In the present case, a consumer should be understood to mean any consumer who consumes media transported in the supply network. By way of example, in a water supply network, a consumer can be a single-family house, an apartment building, an office building, a school, an industrial plant or a municipal institution. A corresponding statement applies to district heating networks.

In the present case, a consumption profile should be understood to mean a profile which characterizes the consumption by a respective consumer for a predetermined time interval.

In the present case, pressure profiles or flow profiles should be understood to mean profiles which specify the temporal course of the pressure in the supply network, in particular at nodes, or in pipes or lines of same, or the temporal course of the flow through the supply network, in particular through nodes, or pipes or lines of same.

"Second point" means a point in the supply network that differs from the "first point".

In accordance with one embodiment, the data are reduced in step c) on the basis of a series expansion. This advantageously renders it possible to transform the data into a smaller mathematical space, which enables a simpler analysis of same. As a result of this, step c) can be executed quickly and with little complexity by way of a processor.

In accordance with a further embodiment, the data are reduced on the basis of a POD method. POD represents proper orthogonal decomposition, which is also referred to as principal component analysis. Accordingly, the data are approximated by linear combinations of a small number of meaningful basis vectors. As a result of this, step c) can be executed quickly and with little complexity by way of a processor.

In accordance with a further embodiment, step e) comprises the reconstruction of the at least one second pressure and/or flow value using a gappy POD method. By way of example, this method is described in more detail in [KW]. The gappy POD method uses a POD basis in order to back calculate the missing data, such as e.g. at least one second pressure and/or flow value, from available data of at least one pressure and/or flow value. As a result of this, step e) can be executed quickly and with little complexity by way of a processor.

In accordance with a further embodiment, second pressure or flow values are generated at different instants on the basis of the same series approach M. Expressed differently, the series approach M is independent of time. The series approach M can therefore be established "offline", cf. the matrix M in [KW]. In the end, the reconstruction of the data, in this case e.g. the second pressure and/or flow values at different times, only requires the calculation of coefficients of the series expansion for the pressure and/or flow values currently detected or measured in the supply network. With the aid of the calculated coefficients, it is possible to calculate the "missing" pressure and/or flow values by simple summing a small number of series members. As a result of this, step c) can be executed quickly and with little complexity by way of a processor.

In accordance with a further embodiment, step a) comprises the following steps: determining an overall consumption of all consumers, determining a share of the overall consumption for a respective consumer, assigning a consumption value of zero for the respective consumer, setting an amount Q of the medium which is less than the determined overall consumption, selecting a consumer, with the probability of a consumer being selected corresponding to their share of the overall consumption, increasing the consumption value of the selected consumer by the amount Q, and repeating the steps of selecting a consumer and increasing the consumption value for as long as the sum of the consumption values of all consumers is less than the determined overall consumption. By way of example, the period of time is between 1 and 3 minutes. By way of example, the amount Q can be 3 liters in the case of a water supply network. By virtue of the amount Q being distributed in this manner to the individual consumers, their consumer behavior can easily be simulated. Depending on the consumer behavior or the established consumption profiles, it is then easily possible to establish the data describing pressure and/or flow profiles for the pipes and nodes of the supply network.

In accordance with a further embodiment, step b) comprises a determination of the data describing the pressure and/or flow profiles while a respective consumer consumes the amount of the medium. A very specific situation in respect of the flows and pressures in nodes and pipes of the supply network emerges for each period of time as a result of the outflow of the amount Q. Accordingly, a "data point" comprising a pressure and/or flow value for a respective point in the supply network emerges per period of time.

In accordance with a further embodiment, the data describing pressure and/or flow profiles for the respective period of time are calculated according to the Monte Carlo method. The totality of the occurring pressure and/or flow profiles is described by the Monte Carlo method (also referred to as Monte Carlo simulation) using individual statistical random experiments. Accordingly, the data for a respective period of time are calculated a number of times. As a result of this, the quality of the data is improved.

In accordance with a further embodiment, the at least one first pressure and/or flow value at the at least one first point in the supply network is registered by means of at least one first sensor, wherein the at least one first point is selected on the basis of the POD method, in particular the gappy POD method. This enables a placement of the first sensor which is optimized for the reconstruction of the data, in particular the at least one second pressure and/or flow value. Alternatively, use can also be made of already available or installed sensors for detecting the pressure or flow values, in particular the at least one first pressure and/or flow value.

In accordance with a further embodiment, a minimum pressure is established from the at least one first pressure value and the at least one second pressure value. The at least one pump and/or the at least one valve is/are actuated in a manner dependent on the difference between an intended value and the established minimum pressure. The intended pressure value for example corresponds to a minimum pressure prescribed by law. Accordingly, the at least one pump and/or the at least one valve is therefore actuated in such a way that the pressure lies below the intended pressure value at no point within the supply network. However, at the same time, such a control is sought after that the minimum pressure in the entire supply network equals the intended pressure value or is only slightly thereabove. As a result, the network components in the supply network can be spared.

In accordance with a further embodiment, the data in step b) describe pressure and/or flow profiles at nodes and/or in pipes of the supply network.

In accordance with a further embodiment, the supply network is a water supply network.

Furthermore, a device for pressure control in a supply network for supplying consumers with a medium is provided. The supply network has at least one pump for pumping the medium and/or at least one valve for controlling a medium flow. The device furthermore comprises: a determination unit for determining at least one consumption profile for each of the consumers, a determination unit for determining data describing pressure and/or flow profiles in the supply network on the basis of the consumption profiles, a reduction unit for reducing the data into reduced data, a detection unit for detecting at least one first pressure and/or flow value at at least one first point in the supply network, a reconstruction unit for reconstructing at least one second pressure and/or flow value at at least one second point in the supply network from the reduced data by means of the at least one first pressure and/or flow value, and an actuation unit for actuating the at least one pump and/or the at least one valve on the basis of the at least one first pressure and/or flow value and the at least one second pressure and/or flow value.

The respective units can furthermore be embodied to implement and carry out developments of the method.

A respective unit, for example the determination units, reduction unit, detection unit, reduction unit or actuation unit, can be implemented in terms of hardware and/or else in terms of software. In the case of an implementation in terms of hardware, the respective unit can be embodied as a device or as part of a device, for example as a computer or microprocessor. In the case of an implementation in terms of software, the respective unit can be embodied as a computer program product, as a function, as a routine, as part of a program code or as an executable n.

Furthermore, a supply network for supplying consumers with a medium is provided. The supply network comprises nodes and/or pipes, at least one pump for pumping the medium through the nodes and/or pipes and/or at least one valve for controlling a medium flow through the nodes and/or pipes, and at least one device, as described above, which actuates the at least one pump and/or the at least one valve.

The embodiments and features described for the method apply correspondingly to the device and the supply network.

Further possible implementations of embodiments of the invention also comprise combinations, which are not explicitly mentioned, of features or embodiments described above or below in respect of the exemplary embodiments. Here, a person skilled in the art will also add individual aspects as improvements or additions to the respective basic form of embodiments of the invention.

BRIEF DESCRIPTION

Some of the embodiments will be described in detail, with reference to the following figures, wherein like designations denote like members, wherein.

Provided nothing else is specified, equivalent or functionally equivalent elements have been provided with the same reference sign in the figures.

DETAILED DESCRIPTION

Figure 1:
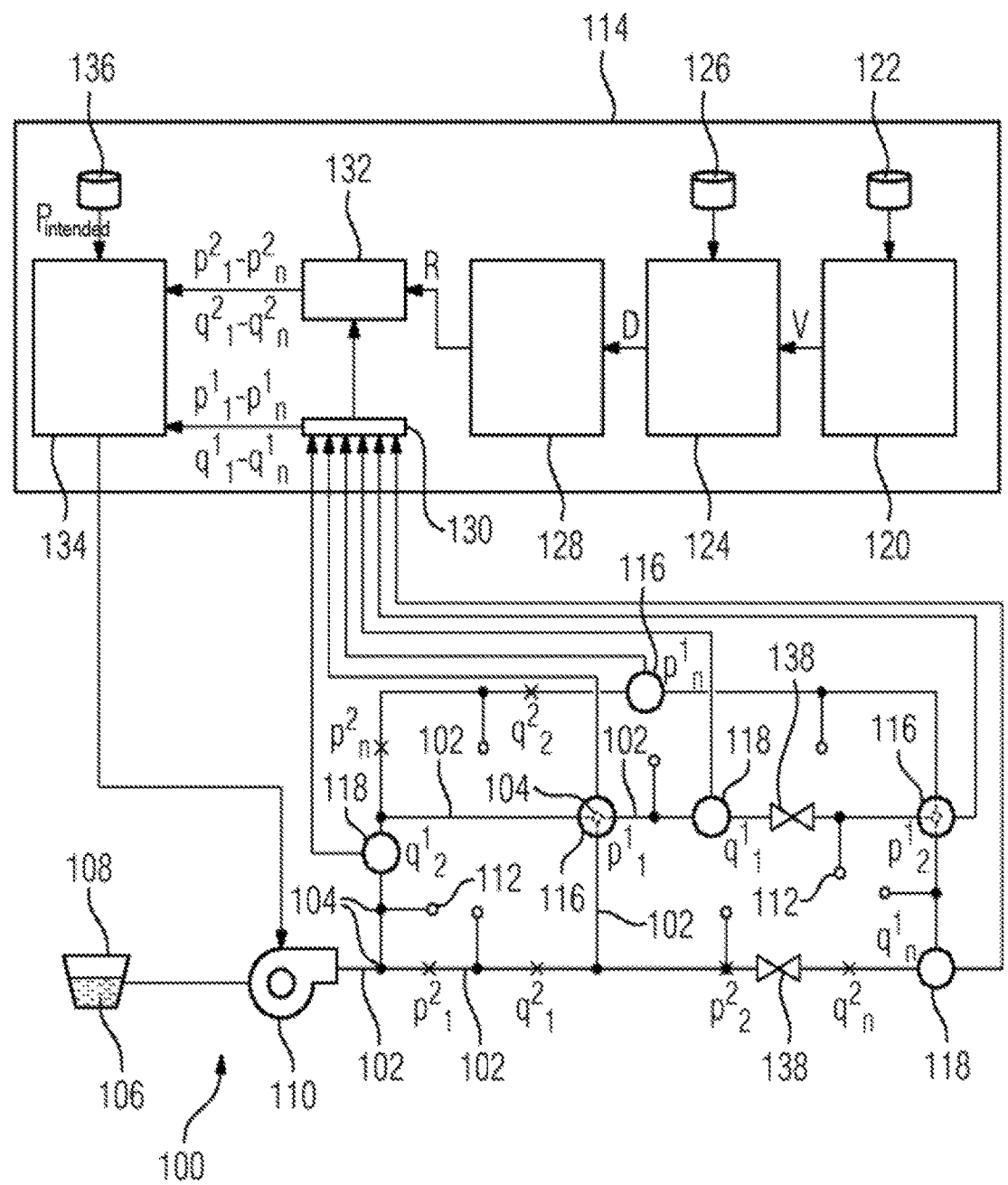
FIG. 1 shows a supply network in accordance with one embodiment.

FIG. 1 shows a supply network 100. By way of example, the shown supply network 100 is a so-called DMA (district metering area) in a larger, superordinate supply network which, incidentally, is not depicted.

By way of example, the supply network 100 is a water supply network and it is composed of pipes or lines 102, which merge at nodes 104. Via the pipes 102 and nodes 104, water 106 from a store 108 is distributed to consumers 112 by way of a pump 110. In addition to the pump 110, provision could also be made of a valve (not depicted here), which controls a water flow through the supply network 100.

Furthermore, provision is made of a device 114, which actuates the pump 110, in particular an electric motor of same, in order thus to adjust a pressure which the pump 110 applies to the water. The pump 110 or the motor thereof can have a variable rotational speed, with the rotational speed being controlled by the device 114. The device 114 is signal-connected to pressure sensors 116 and flow sensors 118 of the supply network 100.

By way of example, the device 114 is embodied as a computer apparatus, in particular as a microprocessor. The device 114 comprises units mentioned below, which can be embodied thereon in terms of hardware and/or software. Furthermore, the device can have one or more stores described in more detail below. The stores can be provided as separate storage apparatuses. Alternatively, the stores can be provided as separate logical storages on a single storage apparatus.

Figure 4:
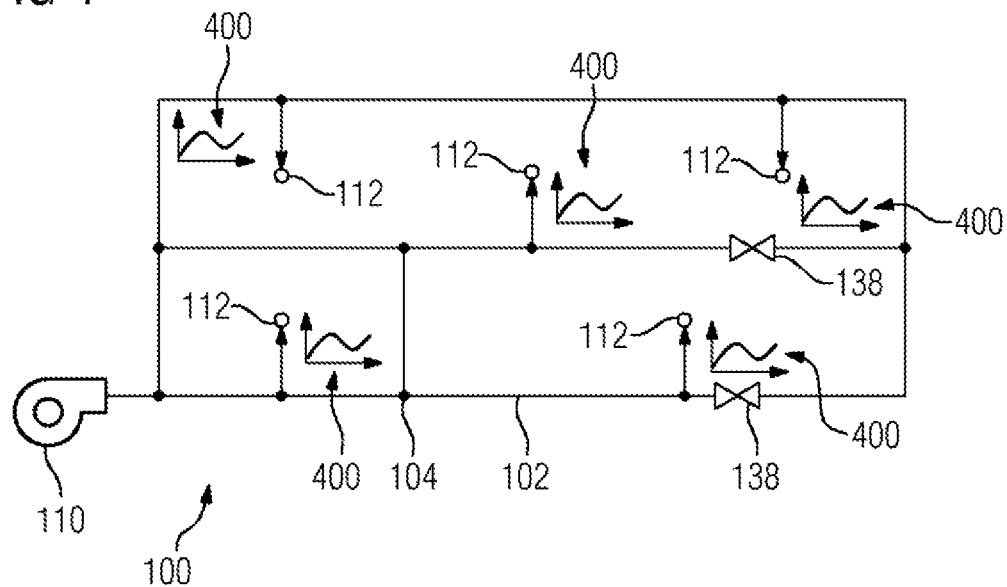
FIG. 4 shows a section of the supply network in accordance with FIG. 1, together with exemplary consumption profiles in accordance with one embodiment.

Initially, the device 114 comprises a first determination unit 120 for determining consumption profiles for the consumers 112. FIG. 4 shows, in an exemplary manner, consumption profiles 400 of the consumers 112. The respective consumption profile 400 shows a consumption of the medium over time. Here, FIG. 4 shows a section of FIG. 1 with the pipes or lines 102 and consumers 112. The first determination unit 120 can be connected to a store 122 of the device 114. By way of example, an overall consumption of all consumers 112 can be stored in the store 122. This overall consumption emerges, for example, from a corresponding consumption bill from the municipal utilities and can be read by way of an interface or entered by a user.

Furthermore, the device 114 has a second determination unit 124, which may likewise be connected to a store 126. The determination unit 124 determines data D describing pressure and/or flow profiles of the supply network 100 on the basis of the consumption profiles 400 determined by the first determination unit 120 or on the basis of the consumption profile data V correspondingly transferred from the first determination unit 120 to the second determination unit 124. The consumption profile data V can differ from the consumption profiles 400 to the extent that these contain e.g. less or less complex data.

Figure 5:
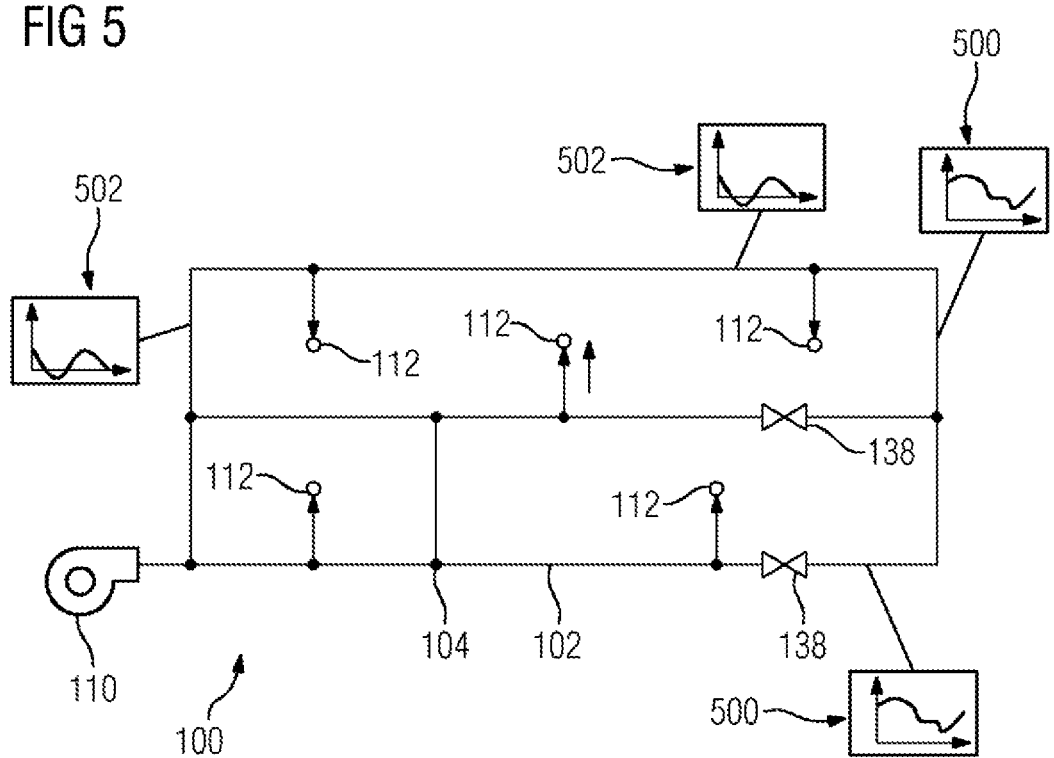
FIG. 5 shows a section of the supply network in accordance with FIG. 1, together with pressure and/or flow profiles in accordance with one embodiment.

FIG. 5 shows a section of the supply network 100 with lines 102 and nodes 104 and exemplary pressure profiles 500 and flow profiles 502, which are determined at any desired points in the pipes 102 or nodes 104. By way of example, a respective pressure profile 500 describes a water pressure, which lies between approximately 3 and 7 bar and which varies as a function of time. By way of example, information in respect of the length of the pipes 102, in respect of frictional losses within the pipes 102, in respect of the number of pipes 102 and node points 104 and the arrangement thereof, the topography of the terrain or of the supply network 102, etc., may be stored in the store 126. From these data, the determination unit 124 determines the data D describing the pressure and/or flow profiles 500, 502 in a manner dependent on the consumer profiles 400.

Furthermore, the device 114 has a reduction unit 128. The reduction unit 128 reduces the data D determined by the determination unit 124 into reduced data R. To this end, the reduction unit 128 can make use of a series expansion, in particular a POD method.

Furthermore, the device 114 has a detection apparatus 130 in the form of a sensor interface. The sensor interface 130 is signal-connected to the pressure and flow sensors 116, 118. Here, the pressure sensors 116 establish first pressure values $p^1_1$-$p^1_n$, and the flow sensors 118 establish first flow values $q^1_1$-$q^1_n$.

A reconstruction unit 132 of the device 114 reconstructs second pressure and flow values $p^2_1$-$p^2_n$, $q^2_1$-$q^2_n$ at second points that differ from the first points. The second points are in each case indicated by a cross in FIG. 1. This reconstruction is carried out on the basis of the reduced data provided by the reduction unit 128, with use being made of the first pressure and flow values Finally, an actuation unit 134 activates the pump 110 on the basis of the first pressure and/or flow values and the second pressure and/or flow values $p^2_1$-$p^2_n$, $q^21$-$q^2n$. Furthermore, the actuation can take place on the basis of an intended pressure value $P_{intended}$ stored in a store 136. The intended pressure value $P_{intended}$ can be, in particular, a minimum pressure prescribed by law, which may not be undershot at any point in the supply network 100. The actuation unit 134 accordingly actuates the pump 110.

Figure 2:
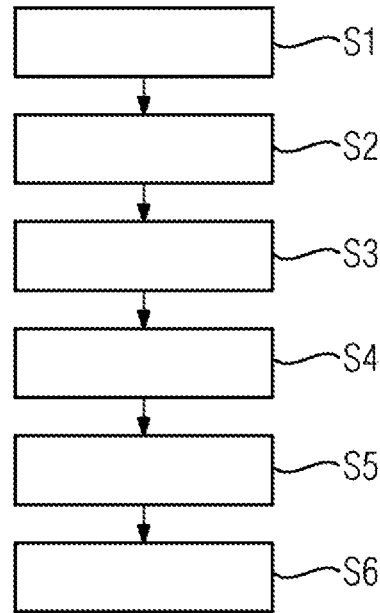
FIG. 2 shows a flowchart of an embodiment of the method.

FIG. 2 shows a flowchart of a method in accordance with one embodiment of the invention. The method is suitable for pressure control in the supply network 100 and it is, in particular, carried out on the device 114. Here, even further embodiments, which are not explained in conjunction with FIG. 1, are described below and these are equally implementable on the device 114.

In a step S1, the consumption profiles 400 are determined for each one of the consumers 112.

Figure 3:
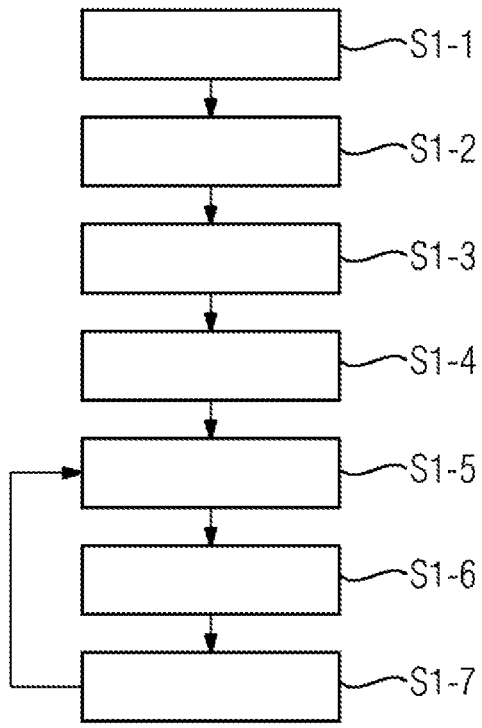
FIG. 3 shows a flowchart of a further embodiment of the method.

By way of example, this can be carried out using a method as explained in more detail below with reference to FIG. 3.

In accordance with a step S1-1, an overall consumption of all consumers 112 in the supply network 100 is determined. By way of example, this overall consumption can be calculated by virtue of the end-of-year bills of the respective consumers being summed and divided by the number of days in the year.

In a further step S1-2, the share of the overall consumption of a respective consumer 112 is determined. By way of example, this share can be calculated by virtue of the end-of-year bills of the respective consumers 112 being related to one another. Both the information relating to the overall consumption and the information relating to the share of a respective consumer 112 can be stored e.g. in the store 122.

In a further step S1-3, a value of zero is now assigned to each one of the consumers 112. In this respect, this relates to a consumer 112 simulated on e.g. the determination unit 120 in terms of software.

In a step S1-4, an amount Q of the medium, water in this case, is set, which amount is less than the determined overall consumption. In particular, the amount Q should be significantly less than the determined overall consumption. By way of example, in accordance with the present exemplary embodiment of a water supply network, the amount Q could be 3 liters.

A (virtual) consumer 112 is now selected in a step S1-5. The selection is random, with the probability of a consumer 112 being selected corresponding to their share of the overall consumption. By way of example, if the share of a consumer 112 of the overall consumption is 10%, the probability that said consumer is selected is also 10%.

Subsequently, the selected consumer 112 takes up the amount Q from the supply network 100 over a period of time t of e.g. 1 to 3 minutes, i.e. they consume it. Therefore, a consumption value of the selected consumer 112 is increased by the amount Q in a step S1-6.

The sum of the consumption values of all consumers 112 is compared to the determined overall consumption in a step S1-7. If this sum is less than the determined overall consumption, steps S1-5 to S1-7 are repeated.

Hence, the consumption profiles 400 for a respective consumer 112, shown in FIG. 4, are generated. In the described exemplary embodiment, the consumers 112 were classified only on the basis of their share of the overall consumption. By contrast, the classification can also provide for the consumers to be assigned a specific consumption profile depending on the building type, e.g. a single-family house, an apartment building, a terraced house, an office building, a school, a municipal institution or an industrial plant.

Now returning to FIG. 2, what is shown there is a step S2, which follows step S1. In step S2, the pressure and/or flow profiles 500, 502 or the data describing these are determined, as shown in FIG. 5. Calculations are carried out in the determination unit 124 with knowledge of the outflows (corresponding to the consumption profiles 400) and potential inflows by way of the pump 110. By way of example, these calculations relate to the length of the pipes 102, to the topology of the supply network 100 and to further information which, in particular, is stored in the store 126. The pressure and flow values are calculated at each point in the supply network 100 or at suitably many points in order to obtain a desired high resolution. Here, the pressure and flow values are calculated for each one of the periods of time t mentioned in conjunction with step S1-6. The data D describing the pressure and flow profiles can be calculated a number of times for a respective period of time t within the meaning of the Monte Carlo method.

In step S3, the data D or the simulation data are reduced in the reduction unit 128. The data reduction can take place, in particular, on the basis of a series expansion, in particular on the basis of a POD method. Expressed differently, a combination of a few basis vectors is found, which approximates the data D or the simulation model to a sufficiently good extent. By way of example, the POD method is described in [KW].

Before step S4 now takes place, the pressure and flow sensors 116, 118 can be arranged in the supply network 100 on the basis of the gappy POD method, which is likewise described by [KW]. Here, the pressure and flow sensors 116, 118 are initially placed in a heuristic method at the local spatial optimums for the individual POD modes. By minimizing the condition number of the matrix M of the gappy POD method, the placement of the pressure and flow sensors 116, 118 can be improved further. Alternatively, the pressure and flow sensors 116, 118 can also be provided at arbitrary positions—for example in the case where these have already been securely installed.

The aforementioned steps S1-S3 can be carried out "offline", in particular before the supply network 100 is put into operation.

In step S4, the pressure and flow values $p^1_1$-$p^1_n$, $q^1_1$-$q^1_n$ are now detected by means of the pressure and flow sensors 116, 118 at points respectively assigned thereto.

In step S5, the pressure and flow values $p^2_1$-$p^2_n$, $q^2_1$-$q^2_n$ are reconstructed or projected with a suitable resolution. This reconstruction or projection is carried out in the reconstruction unit 132, wherein use is made of the reduced data R and the already measured pressure and flow values $p^1_1$-$p^1_n$, $q^1_1$-$q^1_n$. The reconstruction is preferably carried out using a gappy POD method, as described in [KW].

The gappy POD method comprises the establishment of a series approach, denoted as matrix M in [KW]. It is also possible to generate the matrix M "offline", i.e. in particular prior to the supply network 500 being put into operation, by way of, in particular, the reduction unit 132. In the "online" part, it is then possible to calculate the coefficients, denoted $b^i$ in [KW], of the series expansion for the current pressure and flow values $p^1_1$-$p^1_n$, $q^1_1$-$q^1_n$. Since the positions of the pressure and flow sensors 116, 118 do not change during operation, there is no change either in the corresponding mask vector, which is denoted $n^k$ in [KW], and so the series approach M correspondingly does not change over time, i.e. it is time independent. Consequently, the reconstruction of the pressure and flow values $p^2_1$ to $p^2_n$, $q^2_1$ to $q^2_n$ is limited to summing a small number of series members. The calculations can be carried out correspondingly quickly, and so a delay-free control, in particular a real-time control, of the pump 110 is possible.

Figure 6:
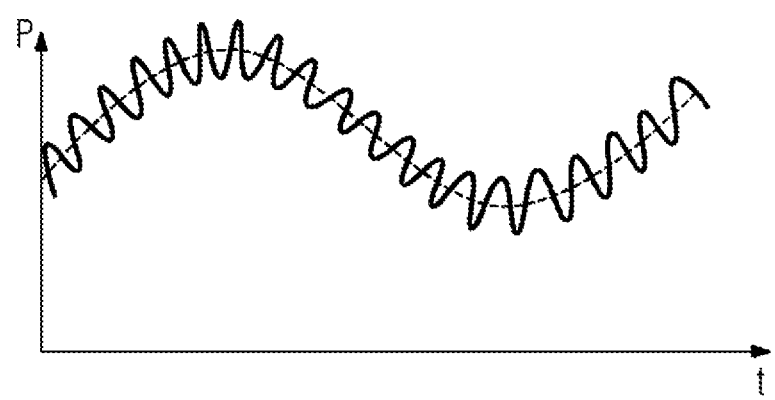
FIG. 6 shows a diagram of a pressure curve in accordance with one embodiment.

The data reduction which was carried out is illustrated graphically on the basis of FIG. 6. By means of series approaches, the data sets are approximated, wherein each measurement row can be represented as a "smooth approximation" and a small high-frequency disturbance. The reduced data R then only still contains the smooth approximation.

In step S5, the pump 110 is actuated by means of the actuation unit 134 in particular. The actuation is carried out on the basis of all measured and calculated pressure and flow values $p^1_1$-$p^1_n$, $q^1_1$-$q^1_n$, $p^2_1$-$p^2_n$, $q^2_1$-$q^2_n$.

In particular, the following actuation method can be provided: the actuation unit 134 establishes the minimum pressure from all pressure values $p^1_1$-$p^1_n$, $p^2_1$-$p^2_n$ and compares said minimum pressure to the intended pressure value $p_{intended}$. For as long as the established minimum pressure lies above the intended pressure value $p_{intended}$, said actuation unit reduces the pressure generated by the pump 110, for example by a corresponding actuation of the electric motor driving the pump 110. As a result, the minimum pressure can be adjusted in such a way that it lies within a tolerance window, which is as small as possible, around the intended pressure value $p_{intended}$ (e.g. intended pressure value $p_{intended}$+/−5%).

Instead of, or in addition to, the pump 110, it is also possible for one or more valves 138 (not shown here) to be arranged in the supply network 100. The valves 138 are configured to control a pressure and/or an amount of flow in the pipes 102 of the supply network 100. The actuation unit 134 can be configured to actuate the valves 138 or the actuators of same in a manner analogous to the pump 110. That is to say, the valves 138 are likewise actuated in such a way that the established minimum pressure lies in the aforementioned tolerance window.

Even though the invention was described in the present case on the basis of specific exemplary embodiments, it is not restricted to these exemplary embodiments and it can be transferred to related fields and applications. Therefore, it is modifiable in a multifaceted way. [TL]: Thornton, J., Lambert, A.: *Progress in Practical Prediction of Pressure: Leakage, Pressure: Burst Frequency and Pressure: Consumption Relationships*. Proceedings of TWA Special Conferences 'Leakage 2005', Halifax, Nova Scotia, Canada, Sep. 12-14, 2005.

[UBRR]: Ulanicki, B., Bounds, P. L. M., Rance, J. P., Reynolds, L.: *Open and closed loop pressure control for leakage reduction.* Urban Water 2, 2000, Elsevier.

[KW]: Willcox, Karen: *Unsteady Flow Sensing and Estimation via the Gappy Proper Orthogonal Decomposition.* MIT, 2004.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method for pressure control in a supply network for supplying consumers with a medium, wherein the supply network has at least one pump for pumping the medium and/or at least one valve for controlling a medium flow, comprising the following steps:
    a) determining at least one consumption profile for the respective consumer that consumes the medium transported in the supply network;
    b) determining data describing pressure and/or flow profiles in the supply network on a basis of the consumption profiles;
    c) reducing the data into a reduced data;
    d) detecting at least one first pressure and/or flow value at at least one first point in the supply network, by a sensor interface signal-connected to at least one of: at least one pressure sensor and at least one flow sensor, positioned within the supply network;
    e) reconstructing at least one second pressure and/or flow value at at least one second point in the supply network from the reduced data by means of the at least one first pressure and/or flow value; and
    f) actuating the at least one pump and/or the at least one valve on a basis of the at least one first pressure and/or flow value and the at least one second pressure and/or flow value.

2. The method as claimed in claim 1, wherein the data are reduced in step c) on a basis of a series expansion.

3. The method as claimed in claim 2, wherein the data are reduced on a basis of a proper orthogonal decomposition (POD) method.

4. The method as claimed in claim 1, wherein step e) comprises a reconstruction of the at least one second pressure and/or flow value using a gappy proper orthogonal decomposition (POD) method.

5. The method as claimed in claim 4, wherein second pressure or flow values are generated at different instants on a basis of the same series approach.

6. The method as claimed in claim 1, wherein step a) comprises the following steps:
    determining an overall consumption of all consumers,
    determining a share of the overall consumption for a respective consumer assigning a consumption value of zero for the respective consumer,
    setting an amount of the medium which is less than the overall consumption, selecting a consumer, with the probability of a consumer being selected corresponding to a share of the consumer of the overall consumption, increasing the consumption value of the selected consumer by the amount, and
    repeating the steps of selecting a consumer and increasing the consumption value for as long as a sum of the consumption values of all consumers is less than the overall consumption.

7. The method as claimed in claim 6, wherein step b) comprises a determination of the data describing the pressure and/or flow profiles while a respective consumer consumes the amount of the medium.

8. The method as claimed in claim 7, wherein the data describing pressure and/or flow profiles are calculated according to the Monte Carlo method.

9. The method as claimed in claim 1, wherein the at least one first pressure and/or flow value at the at least one first point in the supply network is registered by means of at least one first sensor, wherein the at least one first point is selected on the basis of a proper orthogonal decomposition (POD) method.

10. The method as claimed in claim 1, wherein a minimum pressure is established from the at least one first pressure value and the at least one second pressure value and, furthermore, the at least one pump and/or the at least one valve is/are actuated in a manner dependent on a difference between an intended pressure value and the established minimum pressure.

11. The method as claimed in claim 1, wherein the data in step b) describe pressure and/or flow profiles at nodes and/or in pipes of the supply network.

12. The method as claimed in claim 1, wherein the supply network is a water supply network.

13. A device for pressure control in a supply network for supplying consumers with a medium, wherein the supply network has at least one pump for pumping the medium and/or at least one valve for controlling a medium flow, comprising:
    a determination unit for determining at least one consumption profile for a respective consumer that consumes the medium transported in the supply network;
    a determination unit for determining data describing pressure and/or flow profiles in the supply network on a basis of the determined consumption profiles;
    a reduction unit for reducing the data into a reduced data;
    a detection unit for detecting at least one first pressure and/or flow value at at least one first point in the supply network, by a sensor interface signal-connected to at least one of: at least one pressure sensor and at least one flow sensor, positioned within the supply network;
    a reconstruction unit for reconstructing at least one second pressure and/or flow value at at least one second point in the supply network from the reduced data by means of the at least one first pressure and/or flow value; and
    an actuation unit for actuating the at least one pump and/or the at least one valve on a basis of the at least one first pressure and/or flow value and the at least one second pressure and/or flow value.

14. A supply network for supplying consumers with a medium, comprising:
    nodes and/or pipes, at least one pump for pumping the medium through the nodes and/or pipes and/or at least one valve for controlling a medium flow through the nodes and/or pipes, and at least one device as claimed in claim 13, which actuates the at least one pump and/or the at least one valve.

* * * * *